US008798120B2

(12) United States Patent
de Veciana et al.

(10) Patent No.: US 8,798,120 B2
(45) Date of Patent: Aug. 5, 2014

(54) METHODS AND COMMUNICATION SYSTEMS HAVING ADAPTIVE MODE SELECTION

(75) Inventors: Gustavo de Veciana, Austin, TX (US); Hongseok Kim, Chatham, NJ (US); Chan-Byoung Chae, Jersey City, NJ (US); Robert W. Heath, Jr., Austin, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 1002 days.

(21) Appl. No.: 12/727,049

(22) Filed: Mar. 18, 2010

(65) Prior Publication Data

US 2010/0284449 A1    Nov. 11, 2010

Related U.S. Application Data

(60) Provisional application No. 61/161,166, filed on Mar. 18, 2009.

(51) Int. Cl.
*H04B 1/38* (2006.01)

(52) U.S. Cl.
USPC ............................ 375/219; 375/295; 375/260

(58) Field of Classification Search
USPC ......................................... 375/219, 295, 260
See application file for complete search history.

(56) References Cited

U.S. PATENT DOCUMENTS

| 8,081,698 B2 * | 12/2011 | Xu et al. | 375/267 |
| 8,140,023 B2 * | 3/2012 | Bougard | 455/68 |
| 2002/0056066 A1 * | 5/2002 | Gesbert et al. | 714/759 |

OTHER PUBLICATIONS

Borst, S., "User-Level Performance of Channel-Aware Scheduling Algorithms in Wireless Data Networks", *Proc. IEEE INFOCOM*; vol. 1 Apr. 2003, 321-331.
Bougard, B. et al., "SmartMIMO: An Energy-Aware Adaptive MIMO-OFDM Radio Link Control for Next-Generation Wireless Local Area Networks", *EURASIP Journal on Wirless Communications and Networking*; vol. 2007 2007, 1-15.
Catreux, S. et al., "Adaptive Modulations and MIMO Coding for Broadband Wireless Data Networks", *IEEE Comm. Mag.*: vol. 2 Jun. 2002, 108-115.
Chae, C.-B. et al., "Adaptive Spatial Modulation for MIMO-OFDM", *Proc. IEEE WCNC* Mar. 2004, 87-92.
Cui, S. et al., "Cross-Layer Energy and Delay Optimization in Small-scale Sensor Networks", *IEEE Trans, Wirelss Comm.*; vol. 6 Oct. 2007, 3688-3699.
Cui, S. et al., "Energy-Constrained Modulation Optimization", *IEEE Trans. Wireless Comm.*; vol. 4 Sep. 2005, 1-11.
Cui, S. et al., "Energy-Efficiency of MIMO and Cooperative MIMO Techniques in Sensor Networks", *IEEE Jour. Select. Areas in Comm.*; vol. 22 Aug. 2004, 1089-1098.

(Continued)

*Primary Examiner* — Michael Neff
(74) *Attorney, Agent, or Firm* — Dorsey & Whitney LLP

(57) ABSTRACT

Examples are generally described that include methods for selecting a transmit mode in a communications system. An example method may include calculating a first transmission rate for data in a multiple-input multiple-output mode of the communications system and calculating a second transmission rate for the data in a single-input multiple-output mode of the communications system. A mode may be selected from the group consisting of the multiple-input multiple-output mode and the single-input multiple-output mode based, at least in part, on an energy consumption of the first and second transmission rates. Data may be transmitted from a transceiver in the communications system using the selected mode.

29 Claims, 4 Drawing Sheets

(56) References Cited

OTHER PUBLICATIONS

Forenza, A. et al., "Adaptive MIMO Transmission for Exploiting the Capacity of Spatially Correlated Channels", *IEEE Trans. on Veh. Technol.*; vol. 56 Mar. 2007, 619-630.

Gesbert, D. et al., "From Theory to Practice: An Overview of MIMO Space-Time Coded Wireless Systems", *IEEE Jour. Select. Areas in Comm.*; vol. 21 Apr. 2003, 281-302.

Heath, R. W. et al., "Switching Between Spatial Multiplexing and Transmit Diversity Based on Constellation Distance", *IEEE Trans. Communications*; vol. 53 Jun. 2005, 962-968.

Kim, H. et al., "Energy-Efficient Adaptive MIMO Systems Leveraging Dynamic Spare Capacity", *Proc. Conference on Information Sciences and Systems (CISS)* Mar. 2008.

Knopp, R. et al., "Information Capacity and Power Control in Single-cell Multiuser Communications", *Proc. IEEE Int. Conf. on Comm. (ICC)* 1995, 331-335.

Miao, G. et al., "Energy Efficient Design in Wireless OFDMA", *Proc. IEEE Int. Conf. on Comm. (ICC)* May 2008.

Pollin, S. et al., "MEERA: Cross-Layer Methology for Energy Efficient Resource Allocation in Wireless Networks", *IEEE Trans. Wireless Comm*; vol. 6 Feb. 2007, 617-628.

Prabhakar, B. et al., "Energy-Efficient Transmission Over a Wireless Link Via Lazy Packet Scheduling", *Proc. IEEE INFOCOM*; vol. 1 2001, 386-393.

Rajan, D. et al., "Delay-Bounded Packed Scheduling of Bursty Traffic Over Wireless Channels", *IEEE Trans. Information Theory*, vol. 50 2004, 125-144.

Chae, et al., "Adaptive MIMO Transmittion Techniques for Broadband Wireless Communication Systems", IEEE Communication magazine, vol. 48, issue 5, May 2010, pp. 2-9.

Kim, et al., "A Cross-Layer Approach to Energy Efficiency for Adaptive MIMO Systems Exploiting Spare Capacity", IEEE Transaction on Wireless Communication, vol. 8, No. 8, Aug. 2009, pp. 1-29.

Kim, Hongseok et al., "Leveraging Dynamic Spare Capacity in Wireless Systems to Conserve Mobile Terminals' Energy", IEEE/ACM Transaction on Networking, vol. 18, Issue 3, Jun. 2010, 1-14.

\* cited by examiner

METHODS AND COMMUNICATION SYSTEMS HAVING ADAPTIVE MODE SELECTION

CROSS-REFERENCE TO RELATED APPLICATION

This application claims the benefit of the filing date of U.S. Provisional Application Ser. No. 61/161,166, filed Mar. 18, 2009, which application is hereby incorporated by reference in its entirety for any purpose.

BACKGROUND

Unless otherwise indicated herein, the materials described in this section are not prior art to the claims in this application, and are not admitted to be prior art by inclusion in this section.

Multiple-input multiple-output (MIMO) communication systems employ multiple transmit antennas and multiple receive antennas to communicate data symbols over a communications channel. MIMO communication systems may allow a plurality of receivers to be serviced utilizing a same frequency band. In this manner, MIMO communication systems may advantageously increase an amount of data the communication systems are able to send to users.

Single-input multiple-output (SIMO) communication systems may employ a single transmit antenna and multiple receive antennas to communicate data symbols over a communications channel.

MIMO and SIMO systems may find use in a variety of applications including, but not limited to, wireless networks, cellular systems including 3G and 4G systems, such as 3GPP LTE-Advanced, local and wide area networks, and wireless broadband systems (such as WiMAX or WiMAX2).

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

In the drawings.

DETAILED DESCRIPTION

Figure 1:
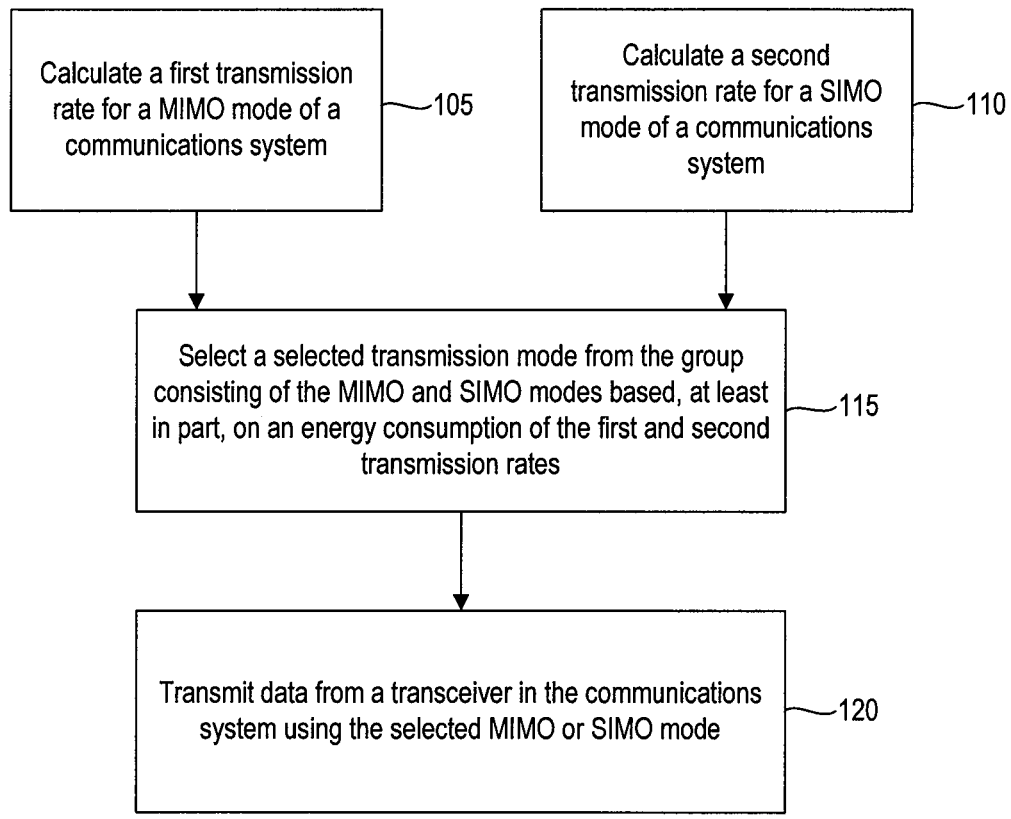
FIG. 1 is a flow diagram illustrating a method for selecting a transmit mode in a communications system.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to selecting a transmit mode in a communications system. An example method may include calculating a first transmission rate for data in a multiple-input multiple-output mode of the communications system and calculating a second transmission rate for the data in a single-input multiple-output mode of the communications system. A mode may be selected from the group consisting of the multiple-input multiple-output mode and the single-input multiple-output mode based, at least in part, on an energy consumption of the first and second transmission rates. Data may be transmitted from a transceiver in the communications system using the selected mode.

FIG. 1 is a flow diagram illustrating some example methods for selecting a transmit mode in a communications system arranged in accordance with at least some examples of the present disclosure. Example methods illustrated by FIG. 1 may include one or more functions, operations or actions as are illustrated by block 105, 110, 115 and/or 120. Processing may begin at block 105 and/or block 110.

In block 105, a first transmission rate for a multiple-input multiple-output (MIMO) mode of a communications system may be calculated. In block 110, a second transmission rate for a single-input multiple-output (SIMO) mode of a communications system may be calculated. Block 115 may follow the conclusion of the calculations of blocks 105 and/or 110. In block 115, a selected mode may be selected from the group consisting of the MIMO and SIMO modes. The selection may be based, at least in part, on an energy consumption of the first and second transmission rates. Block 115 may be followed by block 120. In block 120, data may be transmitted from a transceiver in the communications system using the selected MIMO or SIMO mode. In this manner, as will be described further below, MIMO or SIMO mode operation may be adaptively selected during operation of the communications system.

In block 105, a first transmission rate for a MIMO mode of the communications system may be calculated. The first transmission rate may be calculated based, at least in part, on an energy-optimized rate for data in the MIMO mode. The energy-optimized rate may be based, at least in part, on power consumption of circuitry coupled to a plurality of antennas at the transceiver which are configured to transmit in the MIMO mode. That is, the power consumed by the circuitry used to process signals for antennas used to transmit in the MIMO mode may be included in the calculation of the energy-optimized rate. The energy-optimized rate may also or instead be based, at least in part, on a power consumption of the transceiver during an idle time. The idle time is a time during which the transceiver may be waiting to send data over the communications channel. The transceiver may, for example, be waiting for a scheduled start time for the transceiver to use the communications channel. Generally, greater power is needed to transmit at higher rates in the communications system. Accordingly, power may be saved by reducing the transmission rate in the MIMO mode when a lower transmission rate is acceptable for a particular application, to achieve a particular average throughput in some examples. However, if the transmission rate is too slow, a greater number of transceivers may become idle, waiting to send transmissions over the communications channel. Even if the idling transceivers turn off their transmission chains, some idle power may be consumed due to leakage current or other effects. The idle power spent at a lower transmission rate may accordingly make the lower transmission rate less desirable in some examples.

The energy-optimized rate may be expressed mathematically in the following equation:

$$e_{i,z}(t) = \underset{r}{\mathrm{argmin}}(v_i(t)f_{i,z}(r/v_i(t)) + (1 - v_i(t))p_{idle})\frac{1}{r};$$

where $e_{i,z}(t)$ is the energy-optimized rate for a user i, the index z designates the MIMO mode, and r designates rate. $v_i(t)$ is a fraction of time the user i is transmitting, and $1-v_i(t)$ is a fraction of time the user i is idle. In some examples, where temporally fair scheduling may be used, $v_i(t)$ may be equal to $1/n(t)$ where $n(t)$ is a number of users of the communications system. $f_{i,z}(r/v_i(t))$ is a function for an amount of power consumed by user i during transmission.

Any of a variety of power models may be used to calculate the amount of power consumed by user i during transmission in the MIMO mode. The power consumption expression may vary with the type of receiver used, such as a zero forcing receiver, maximum-likelihood receiver, or MMSE receiver in some examples. In one example, the transmission power equation f(r) may be expressed mathematically as:

$$f(r) = \frac{2N_0}{\eta \phi_1 \phi_2}\left(\sqrt{\left(\frac{\phi_1+\phi_2}{2}\right)^2 + \phi_1\phi_2(2^{r/w}-1)} - \frac{\phi_1+\phi_2}{2}\right) + p_{dc,m};$$

where $N_0$ is the noise power, $\eta$ is an efficiency of a power amplifier used to power one or more transmit antennas; $\phi_1$ and $\phi_2$ are eigenvalues of $H^*H$, where H is a channel matrix representing an operation of a channel on a transmitted data symbol, and $H^*$ is the complex conjugate of H; r is the transmission rate, w is the spectral bandwidth, and $p_{dc,m}$ is a power consumption of circuitry coupled to the multiple antennas configured to transmit in the MIMO mode. The power consumption of the circuitry may include any of a variety of circuit components, including power consumption of one or more digital-to-analog converters, mixers, filters, and frequency synthesizers.

The first transmission rate may be equal to the energy-optimized rate, or may be based on the energy-optimized rate. The calculation of the first transmission rate may also take into account a target rate and a capacity rate in some examples, which will be described further below.

Referring again to FIG. 1, in block 110 a second transmission rate for a SIMO mode of the communications system may be calculated. The order of execution of the blocks 105 and 110 may vary in examples of the invention. All or a portion of the calculations in blocks 105 and 110 may occur in parallel in some examples. In other examples, the calculation of the first transmission rate may occur before the calculation of the second transmission rate, and in other examples, the calculation of the second transmission rate may occur before the calculation of the first transmission rate.

Recall the energy-optimized rate may be mathematically expressed as written above:

$$e_{i,z}(t) = \underset{r}{\mathrm{argmin}}(v_i(t)f_{i,z}(r/v_i(t)) + (1 - v_i(t))p_{idle})\frac{1}{r};$$

in block 110, the z index refers to the SIMO mode. Any of a variety of power models may be used to calculate the amount of power consumed by user i during transmission in the SIMO mode. The power consumption expression may vary with the type of receiver used, such as a zero forcing receiver, maximum-likelihood receiver, or MMSE receiver in some examples. In one example, the transmission power equation f(r) may be expressed mathematically as:

$$f(r) = \frac{1}{\eta}\frac{2^{r/w}-1}{\sum_{l=1}^{N_r}|h_{l,k}|^2}N_0 + p_{dc,s};$$

where $N_0$ is the noise power, $\eta$ is an efficiency of a power amplifier used to power one or more transmit antennas; l is an index of a number of antennas, $N_r$ is a number of receive antennas, and $h_k$ is the kth column vector of the channel matrix H; r is the transmission rate, w is the spectral bandwidth, and $p_{dc,s}$ is a power consumption of circuitry coupled to the multiple antennas configured to transmit in the SIMO mode. The power consumption of the circuitry may include any of a variety of circuit components, including power consumption of one or more digital-to-analog converters, mixers, filters, and frequency synthesizers. Note that in SIMO mode, only one set of circuitry coupled to the single transmit antenna may contribute substantially to the $p_{dc,s}$ term. Accordingly, SIMO mode may consume less power in circuitry for the transmit antennas than MIMO mode at some rates.

While examples of the calculation of first and second transmission rates involving an energy-optimized rate have been described above, in some examples the first and second transmission rates may be specified by the communications system, and may be equal to one another.

Referring again to FIG. 1, in block 115 a selected mode may be selected from the group consisting of the MIMO mode and the SIMO mode based, at least in part, on an energy consumption of the first and second transmission rates. That is, either the MIMO mode or the SIMO mode may be selected based, at least in part, on which mode provides a lower energy per bit for transmission in the communications system. Mathematically, the selection may be described as evaluation of the function for each user i where the selected mode z is given as:

$$\hat{z} = \underset{z \in \{m,s\}}{\mathrm{argmin}}\frac{f_{i,z}(n(t)r_{i,z}(t))}{r_{i,z}(t)},$$

where $f_{i,z}$ is a transmit power function, examples of which were described above, and $r_{i,z}$ represents the first and second transmission rates for the respective modes z.

A crossover point for when SIMO consumes less power than MIMO, or vice versa, may be considered a function of any of a variety of variables including, but not limited to, the power consumed by circuitry processing signals for the receive antennas, a number of receive antennas, and channel correlations. The power consumed by circuitry and number of receive antennas effect the power consumed during transmission, as described above, and accordingly may affect the crossover point. Correlations in the communications channel of the communications system may further effect the crossover point by reducing an available capacity of the MIMO mode, making a SIMO mode more energy efficient in some examples.

The transmission mode may be selected periodically in block 115 in some examples. In some examples, the transmission mode may be selected once for each data frame. In this manner, the transmission mode may be adaptively changed during operation of a communications system.

In block 120, data may be transmitted from a transceiver in the communications system using the selected MIMO or SIMO mode. In some examples, the selection of the MIMO or SIMO mode may be made in a base station of the communications system. The transmission mode may then be communicated to a mobile station, which may then encode data for transmission in accordance with the indicated MIMO or SIMO mode. If SIMO mode is selected, a particular antenna may also be specified for use in transmission. In one example, the antenna selected is one in which the product $h_k^* h_k$ is largest, where $h_k$ is the k-th column vector of the channel matrix H.

Figure 2:
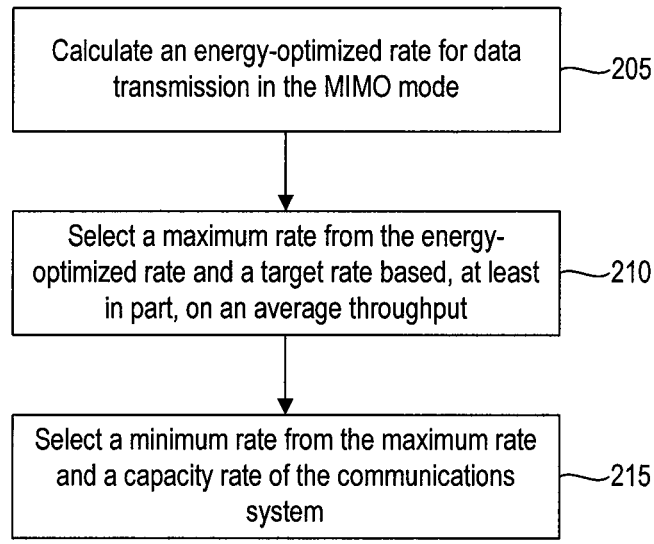
FIG. 2 is a flow diagram illustrating a method for calculating the first transmission rate for a MIMO mode of a communications.

FIG. 2 is a flow diagram illustrating some example methods for calculating the first transmission rate for a MIMO mode of a communications system arranged in accordance with at least some examples of the present disclosure. Example methods illustrated by FIG. 2 may include one or more functions, operations or actions as are illustrated by blocks 205, 210, and/or 215. Processing for the illustrated methods may begin at block 205.

In block 205, an energy-optimized rate for data transmission in the MIMO mode may be calculated, for example, by a base station in a communications system. Block 205 may be followed by block 210. In block 210, a maximum rate may be selected, for example, by a base station in a communications system, from the energy-optimized rate and a target rate based, at least in part, on an average throughput. Block 210 may be followed by block 215. In block 215, a minimum rate may be selected, for example, by a base station in a communications system, from the maximum rate and a capacity rate of the communications system. The minimum rate selected in the block 215 may then be utilized as the first transmission rate described with reference to FIG. 1.

In block 205, an energy-optimized rate for data transmission in the MIMO mode may be calculated, by a device such as a base station in a communications system. Examples of the calculation of the energy-optimized rate have been described above. In some examples, the energy-optimized rate may be used as the first transmission rate used to select the mode. However, in other examples, a different rate may be used, as described further now with reference to FIG. 2.

In block 210, a maximum rate may be selected, by a device such as a base station in a communications system, from the energy-optimized rate and a target rate based, at least in part, on an average throughput. One or more receivers or transmitters in the communications system may specify an average throughput for data. In some examples, the average throughput itself may be equivalent to the target rate. In other examples, the target rate may be reduced relative to the average throughput if the data to be transmitted is fault tolerant, such as in examples where data files are transmitted in the communications system. Accordingly, the target rate represents a rate required by a user, transmitter, or receiver, of the communications system. If the energy-optimized rate is less than the target rate, the target rate may instead be used as the first transmission rate in FIG. 1. If the energy-optimized rate is greater than the target rate, the energy-optimized rate may be used as the first transmission rate in FIG. 1.

Referring again to FIG. 2, in block 215, a minimum rate may be selected, by a device such as a base station in a communications system, from the maximum rate selected in block 210 and a capacity rate of the communications system. The capacity rate may represent a maximum feasible transmission rate of the communications system. Accordingly, if the rate selected in the block 210 is greater than the capacity rate, the capacity rate may be used as the first transmission rate in FIG. 1. If the rate selected in the block 210 is less than the capacity rate, the rate selected in the block 210 may be used as the first transmission rate in FIG. 1. The capacity rate may be calculated based on parameters of the communications system, including an available power supply, for example.

Figure 3:
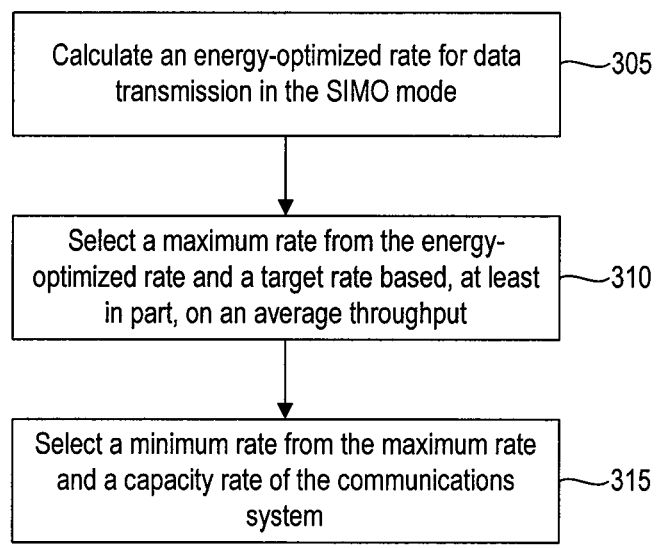
FIG. 3 is a flow diagram illustrating a method for calculating the second transmission rate for a SIMO mode of a communications.

FIG. 3 is a flow diagram illustrating some methods for calculating the second transmission rate for a SIMO mode of a communications system arranged in accordance with at least some examples of the present disclosure. Example methods illustrated by FIG. 3 may include one or more functions, operations or actions as are illustrated by blocks 305, 310, and/or 315. Processing for the illustrated methods may begin at block 305.

In block 305, an energy-optimized rate for data transmission in the SIMO mode may be calculated, for example, by a base station in a communications system. Block 305 may be followed by block 310. In block 310, a maximum rate may be selected, for example, by a base station in a communications system, from the energy-optimized rate and a target rate based, at least in part, on an average throughput. Block 310 may be followed by block 315. In block 315, a minimum rate may be selected, for example, by a base station in a communications system, from the maximum rate and a capacity rate of the communications system. The minimum rate selected in the block 315 may then be utilized as the second transmission rate described with reference to FIG. 1.

In block 305, an energy-optimized rate for data transmission in the SIMO mode may be calculated, for example, by a base station in a communications system. Examples of the calculation of the energy-optimized rate have been described above. In some examples, the energy-optimized rate may be used as the first transmission rate used to select the mode. However, in other examples, a different rate may be used, as described further now with reference to FIG. 3.

In block 310, a maximum rate may be selected, for example, by a base station in a communications system, from the energy-optimized rate and a target rate based, at least in part, on an average throughput. The target rate has been described above. If the energy-optimized rate for the SIMO mode calculated in the block 305 is less than the target rate, the target rate may instead be used as the first transmission rate in FIG. 1. If the energy-optimized rate is greater than the target rate, the energy-optimized rate may be used as the second transmission rate in FIG. 1.

Referring again to FIG. 3, in block 315, a minimum rate may be selected, for example, by a base station in a communications system, from the maximum rate selected in block 310 and a capacity rate of the communications system. The capacity rate has been described above with reference to FIG. 2. If the rate selected in the block 310 is greater than the capacity rate, the capacity rate may be used as the second transmission rate in FIG. 1. If the rate selected in the block 310 is less than the capacity rate, the rate selected in the block 310 may be used as the second transmission rate in FIG. 1.

Figure 4:
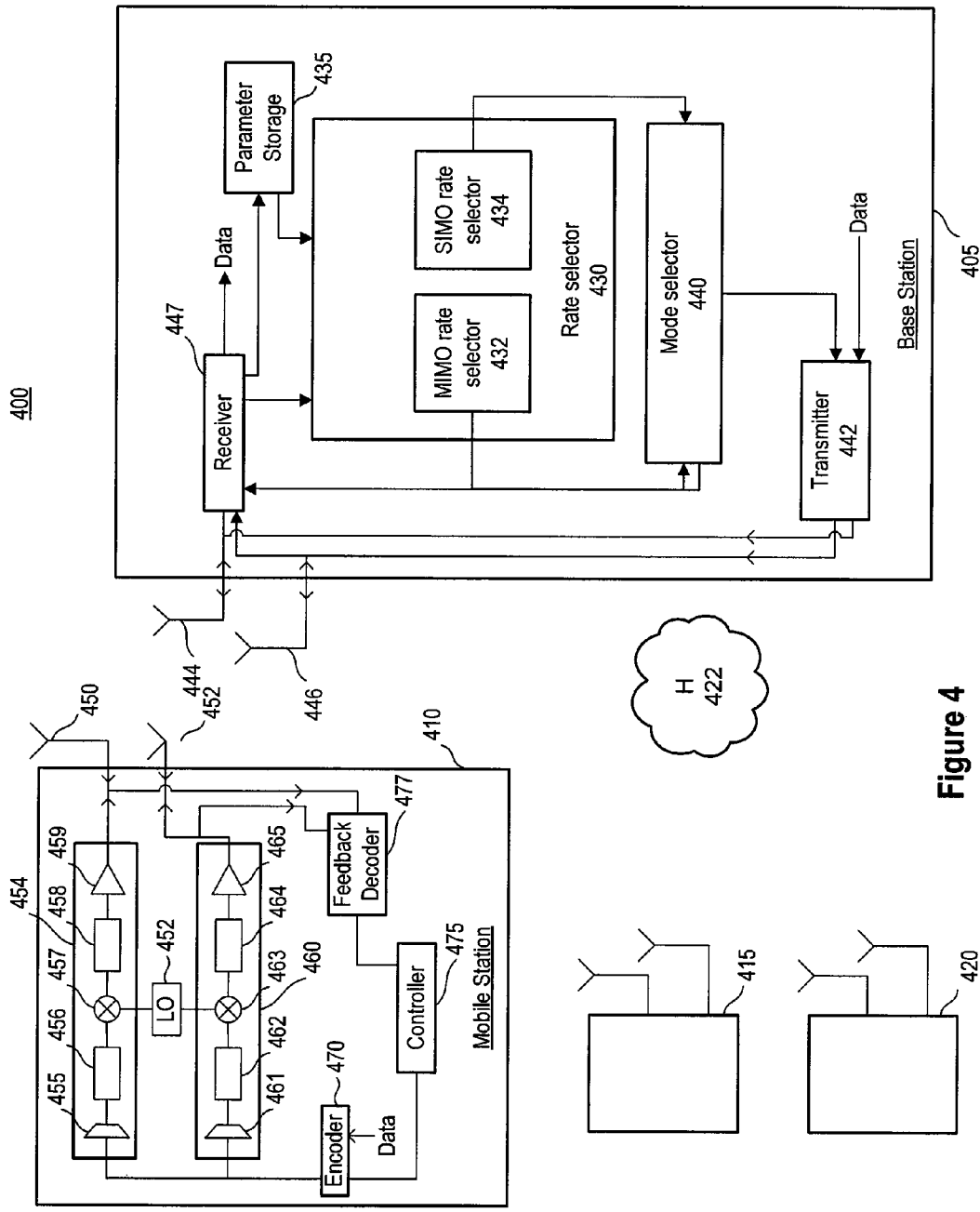
FIG. 4 is a schematic illustration of a communications system, all arranged in accordance with at least some examples of the present disclosure.

FIG. 4 is a schematic illustration of some example communications systems arranged in accordance with at least some examples of the present disclosure. The example communications system 400 includes a base station 405 and three mobile stations 410, 415, and 420. The base station 405 is configured to communicate with the mobile stations 410, 415, and 420 over a communications channel 422 represented by a channel matrix H. The base station 405 includes a rate selector 430, which may include a MIMO rate selector 432 and SIMO rate selector 434. Parameter storage 435 may be coupled to the rate selector 430. A mode selector 440 may be coupled to the rate selector 435 and a transmitter 442. The base station 405 may include two antennas 444 and 446 configured to transmit and/or receive over the communications channel 422. A decoder 447 may be coupled to the antennas 444 and 446 and the transmitter 442, and may be further coupled to the parameter storage 435. The mobile station 410 may include two antennas 450 and 452. First circuitry 454 is coupled to the antenna 450 and configured to process signals for transmission by the antenna 450. The first circuitry may include a digital-to-analog converter 455, a filter 456, a mixer 457, a filter 458, and a power amplifier 459. Second circuitry 460 may be coupled to the antenna 452 and configured to process signals for transmission by the antenna 452. The second circuitry 460 may also include a digital-to-analog converter 461, a filter 462, a mixer 463, a filter 464, and a power amplifier 465. A local oscillator 452 may be coupled to the first circuitry 454 and the second circuitry 460 at the respective mixers 457 and 463. An encoder 470 may be coupled to the first and second circuitry. A controller 475 may be coupled to the encoder 470 and configured to provide a signal to the encoder 470 to operate in a MIMO mode or a SIMO mode. A feedback decoder 477 may be coupled to the controller 475 and one or more of the antennas 450 and 452 and configured to decode received data and provide a signal to the controller 475 corresponding to a selected mode. The mobile stations 415 and 420 may have analogous components to the mobile station 410, which are not shown in FIG. 4. Further, blocks used to encode and modulate data for transmission over the communications channel 422 and decode and demodulate data received over the communications channel 422 have not necessarily been shown in FIG. 4 to avoid obscuring the components shown and described below.

The base station 405 may be configured to communicate with any number of mobile stations, including the mobile stations 410, 415, and 420 shown in FIG. 4. The base station 405 may be configured to transmit data symbols over the communications channel 422 to the base stations 410, 415, and 420. Examples of components of the base station 405 are described further below, however, not all components of the base station 405 may be described. In particular, the base station 405 may include any of a variety of components useful for encoding, decoding, transmitting, and/or receiving over the communications channel including for example encoders, decoders, modulators, demodulators, analog-to-digital converters, digital-to-analog converters, etc.

Any number of antennas may be included at the base station 405, including the antennas 444 and 446. The antennas may be configured to transmit data symbols over the communications channel 422, and receive data symbols over the communications channel. Multiple antennas may be configured to allow for spatial multiplexing, as is generally described above.

The rate selector 430 may be configured to generate a first signal corresponding to a first transmission rate for data in a multiple-input multiple-output mode of the communications system 400 and a second signal corresponding to a second transmission rate for data in a single-input multiple-output mode of the communications system 400. Accordingly, the rate selector 430 may implement examples of the methods for calculating the first and second transmission rates as described above. The rate selector 430 may be implemented in hardware, software, or combinations thereof, and one or more processing units used to implement the rate selector 430 may, in some examples, be shared with other components of the base station 405 described herein. Although shown in the base station 405, the rate selector 430 may in some embodiments be provided at one or more of the mobile stations 410, 415, and 420. That is, in some examples, when the mobile station may be configured to calculate one or more transmission rates as described above. Generally, when the mobile station is configured to calculate the transmission rates, the mobile station may be provided with information suitable for making the calculation, including, for example, information about the channel 422.

The rate selector 430 may include a MIMO rate selector 432 and a SIMO rate selector 434. Although illustrated separately in FIG. 4, the MIMO and SIMO rate selectors may be implemented in some examples using all or portions of the same hardware, software, or combinations thereof. The MIMO rate selector 432 may be configured to calculate the first transmission rate based, at least in part, on an energy-optimized rate for data in the multiple-input-multiple-output mode. The MIMO rate selector 432 may be further configured to calculate the energy-optimized rate.

The SIMO rate selector 434 may be configured to calculate the second transmission rate based, at least in part, on an energy-optimized rate for data in the single-input-multiple-output mode. The SIMO rate selector 434 may be further configured to calculate the energy-optimized rate.

The MIMO and SIMO rate selectors 432 and 434 may accordingly make use of one or multiple parameters of the communications system 400 in calculating the first and second transmission rates, as generally described above, including, but not limited to, idle power consumption of one or more mobile stations, transmission circuitry power consumption of one or more mobile stations, number of users of the communications system, number of receive antennas at the base station or one or more mobile stations, and variations in the communications channel 422. These parameters may be provided to the rate selector 430, including the MIMO and SIMO rate selectors 432 and 434, in any of a variety of ways, examples of which are described further below.

One or more of the parameters used by the rate selector 430 may be stored in the parameters storage 435. Any type of storage device may be used to implement the parameter storage 435, including any type of electronic memory, which may be integral to or in communication with the base station 405.

Various data or other information associated with a power consumption of the mobile station 410 during an idle time, or other mobile stations in the communications system 400 may be stored in the parameter storage 435. Recall the idle time may include times during which the mobile station 410 is waiting to send data over the communications channel, such as waiting for a scheduled time to begin transmission. Alternatively or in addition to storing information related to the power consumption of the mobile station 410 during an idle time, a signal indicative of the power consumption during an idle time may be provided to the rate selector 430, without necessarily storing the parameter. In some examples, a default value may be stored and may be updated by a communication from the mobile station 410, or other mobile stations, over the communications channel 422. A feedback control channel may be used to carry the updated power consumption information, and it may be received and decoded by the receiver 447, and stored in the parameter storage 435.

Various information associated with power consumption of the circuitry 454 and 460 may be stored in the parameter storage 435. The information may include a rate of power consumption of the circuitry 454 or 460 during the transmission of data over the communications channel. Alternatively or in addition to storing information related to the power consumption of the circuitry 454 or 460, a signal indicative of the power consumption of the circuitry 454 or 460 may be provided to the rate selector 430, without necessarily storing the information. In some examples, a default value may be stored and may be updated by a communication from the mobile station 410, or other mobile stations, over the communications channel 422. A feedback control channel may be used to carry the updated circuitry power consumption information, and it may be received and decoded by the receiver 447, and stored in the parameter storage 435.

Various data or other information indicating a number of users of the communications system 400 may be stored in the parameter storage 435, and a signal indicative of the number of users may be provided to the rate selector 430. In some examples, the signal may not be provided by the parameter storage 435, and may be provided by another component of the base station 405 (not necessarily shown in FIG. 4) that has access to the number of users, such as a component of the base station 405 involved in scheduling user transmission.

A number of receive antennas at the base station is known to the base station, and a signal indicative of the number of antennas may be used by the rate selector 430 in calculating the first and second transmission rates for MIMO and SIMO modes, respectively. A number of antennas at one or more of the mobile stations 410, 415, 420, may communicated to the base station 405 and provided to the rate selector 430. Alternatively or in addition, the number of antennas may be stored in the parameter storage 435.

Channel variations or other channel information used by the rate selector 430 may be stored in the parameter storage 435 in some examples, and may be provided to the rate selector 430 by other components of the base station 405 (not necessarily shown in FIG. 4), such as components involved in the generation or analysis of channel state information.

The mode selector 440 may be coupled to the rate selector. The mode selector 440 may be configured to receive the first and second signals indicative of the first and second transmission rates. The mode selector 440 may be configured to select a selected mode from the group consisting of the multiple-input multiple-output mode and the single-input multiple-output mode based, at least in part, on an energy consumption of the first and second transmission rates. The mode selector 440 may be implemented in hardware, software, or combinations thereof, and one or more processing units used to implement the mode selector 440 in some examples may be shared with other components of the base station 440 described herein. Although the mode selector 440 is shown in FIG. 4 in the base station 405, in other examples the mode selector 440 may be implemented in one or more mobile stations, such as the mobile station 410, 415, or 420. The mode selector 440 may be configured to implement examples of methods described above for selecting between the MIMO and SIMO mode. In making the selection, the mode selector 440 may also be provided with one or more signals indicative of parameters of the communications system 400, as generally described above with reference to the rate selector 430. The mode selector 440 may also be configured to identify one of a plurality of transmit antennas at a mobile station to use when SIMO mode is selected. The mode selector 440 may also provide a signal corresponding to the selected mode to the receiver 447.

The transmitter 442 may be coupled to the mode selector 440 and configured to transmit a signal corresponding to the selected mode to one or more of the mobile stations, such as the mobile station 410. In some examples, the transmitter 442 may also be configured to encode data to be transmitted over the communications channel. In some examples, the signal corresponding to the selected mode may be implemented as a bit that may be included in one or more data frames. As mentioned above, the transmission mode may be changed periodically. In some examples, the transmission mode may be selected once for each data frame. In this manner, the transmission mode may be adaptively changed during operation of a communications system.

The transmitter 442 may also be configured to transmit a signal indicative of which of a plurality of transmit antennas at the mobile station to use when the mode is SIMO. For example, the transmitter 442 may be configured to transmit an indication that the antenna 450 at the mobile station 410 should be used to transmit when SIMO mode is selected.

The receiver 447 may be configured to receive and decode data from the communications channel 422. The receiver 447 may be provided with a signal indicative of the selected mode from the mode selector 440. Responsive to the signal, the receiver 447 may change the manner in which received data is decoded. The receiver 447 may thus be dynamically configured to decode received data in a different manner based on whether the SIMO mode is selected or the MIMO mode is selected. Any suitable strategy for SIMO or MIMO decoding may be implemented by the receiver 447. In some examples, multiple decoders may be included in the base station 405, including one for SIMO decoding and one for MIMO decoding. While in some examples the receiver 447 may implement a decoding method based on a selected mode provided by the mode selector 440, in other examples the receiver 447 may implement a decoding method based on mode information received from one or more mobile stations, such as the mobile station 410. In some examples as will be discussed further below, the mobile station 410 may be configured to override a mode selection received from the mode selector 440, and a different mode may be used to transmit. The receiver 447 may accordingly be dynamically configured to decode data in accordance with a mode indicator received from one or more mobile stations. The receiver 447 may also decode feedback information received from one or more mobile stations, and provide signals to one or more of the parameter storage 435 and/or the rate selector 430.

Any number of mobile stations may generally be configured for communication with the base station 405. Three mobile stations 410, 415, and 420 are shown in FIG. 4. Any of a variety of devices may be used as a mobile station, including but not limited to, cellular telephones, laptop computers, desktop computers, and personal digital assistants or other similar computing devices that are configured for MIMO/SIMO communications. A device need not be mobile to be used as a mobile station. Components of all mobile stations are not shown in FIG. 4. The mobile station 410 will be described as an example, and the mobile stations 415 and 420 may also include components analogous to those described with reference to the mobile station 410.

The mobile station 410 may be configured to communicate data symbols over the communications channel 422 and receive data symbols over the communications channel 422. While a single communications channel 422 is shown in FIG. 4, multiple communications channels may be utilized by the communications system 400. Not all components of the mobile station 410 are shown in FIG. 4, and any of a variety of components useful for the sending and receiving of data symbols may be included in the mobile station 410 including, but not limited to, encoders, decoders, modulators, demodulators, analog-to-digital converters, and digital-to-analog converters.

Circuitry 454 and 460 may be coupled to the antennas 450 and 452, respectively. The circuitry 454 and 460 may be configured to process signals for transmission by the antennas 450 and 452. The circuitry 454 may include a digital-to-analog converter 455, filter 456, mixer 457, filter 458, and power amplifier 459. The circuitry 460 may include a digital-to-analog converter 461, filter 462, mixer 463, filter 464, and power amplifier 465. A local oscillator 466 may be coupled to both the circuitry 454 and 460 at the respective mixers 457 and 463. The power consumption of the circuitry 454 and 460 may be used to calculate the MIMO and SIMO transmission rates, as generally described above. Accordingly, a signal indicative of the power consumption of the circuitry 454 and 460 may in some examples be communicated to the base station 405. In other examples, the base station 405 may determine an approximation of the power consumption of the circuitry 454 and 460.

A feedback decoder 477 may be coupled to the antennas 450 and 452 and configured to decode feedback signals received from the base station 405. The feedback signals may include control signals corresponding to a selected mode, selected rate, selected antenna for use in SIMO mode, or combinations of those, as generally described above. A feedback control channel may be used to communicate the feedback information, and generally any type of feedback control channel may be used, including for example a dedicated or an optional feedback control channel.

A controller 475 may be coupled to the feedback decoder 477 and an encoder 470. The controller 475 may be provided with a signal indicative of the selected mode, selected rate, selected antenna, or combinations thereof. Based on the received signals, the controller may configure the encoder 470 to encode data using the selected mode, selected rate, selected antenna, or combinations thereof. That is, as described above, the base station 405 may be configured to communicate a selected mode of MIMO or SIMO mode to the mobile station 410. If the selected mode is a MIMO mode, the controller 475 may provide a control signal to the encoder 470 to configure the encoder 470 for MIMO operation using both the antennas 450 and 452. If the selected mode is SIMO mode, the controller 475 may provide a control signal to the encoder 470 to configure the encoder 470 for SIMO operation using either the antenna 450 or 452. In some examples, the controller 475 may not configure the encoder 470 in accordance with the mode selected by the base station 405, but may override that selection based on some other criteria. For example, if a battery power at the mobile station 410 is too low to implement a mode selection made by the base station 405, the controller 475 may implement a different mode. The controller may be implemented in hardware, software, or combinations thereof, and one or more processing units used to implement the controller 475 in some examples may be shared with other components of the mobile station 410.

Figure 5:
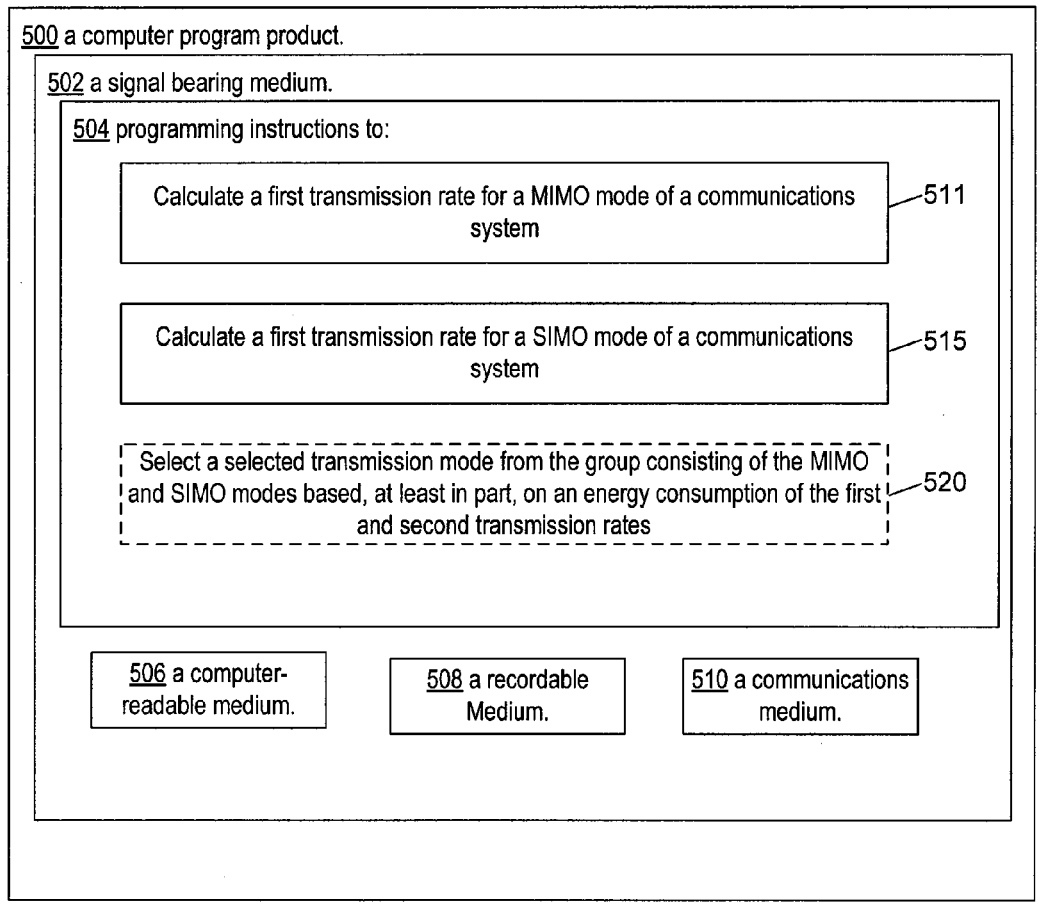
FIG. 5 is a block diagram illustrating an example computer program product 500 that is arranged to store instructions for selecting a transmission rate and selecting a transmission mode in accordance with at least some examples of the present disclosure.

The encoder 470 may be coupled to the circuitry 454 and 460 and configured to encode data for transmission over the communications channel 422 in accordance with a control signal provided by the controller 475. In particular, the encoder may be dynamically configured to encode data in either a MIMO mode or a SIMO mode. While one encoder is shown in FIG. 4, any number may be used, including one for MIMO mode and one for SIMO mode. The encoder 470 may be implemented in hardware, software, or combinations thereof, and one or more processing units used to implement the encoder 470 may be shared with other components of the mobile station 410. FIG. 5 is a block diagram illustrating an example computer program product 500 that is arranged to store instructions for selecting a transmission rate and selecting a transmission mode in accordance with at least some examples of the present disclosure. The signal bearing medium 502 which may be implemented as or include a computer-readable medium 506, a recordable medium 508, a communications medium 510, or combinations thereof, stores instructions 504 that may configure one or more processing units to perform all or some of the processes previously described. These instructions may include, for example, one or more executable instructions 511 causing one or more processing units to calculate 511 a first transmission rate for a MIMO mode of a communications system, calculate 515 a second transmission rate for a MIMO mode of a communications system, and select 520 a selected transmission mode from the group consisting of the MIMO and SIMO modes based, at least in part, on an energy consumption of the first and second transmission rates. The computer program product 500 may be stored at least partially in a base station of the communications system in some examples, and the base station may also execute the programming instructions shown in FIG. 5 in some examples.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method for selecting a transmission mode for a transceiver in a communications system, the method comprising:
   calculating a first transmission rate for data in a multiple-input multiple-output (MIMO) mode of the communications system;
   calculating a second transmission rate for the data in a single-input multiple-output (SIMO) mode of the communications system; and
   selecting the transmission mode based, at least in part, on an energy consumption of the transceiver associated with the first and second transmission rates, wherein selecting the transmission mode is further based at least in part, on a number of users of the communications system, and wherein the selected transmission mode corresponds to either the MIMO mode or the SIMO mode.

2. The method of claim 1, further comprising: transmitting data from the transceiver in the communications system using the selected transmission mode.

3. The method of claim 1, wherein calculating the first transmission rate comprises calculating the first transmission rate based, at least in part, on an energy-optimized rate for data in the MIMO mode.

4. The method of claim 3, wherein the energy-optimized rate is based, at least in part, on a power consumption of circuitry coupled to a plurality of antennas at the transceiver when the communications system is configured to transmit in the MIMO mode.

5. The method of claim 1, wherein calculating the second transmission rate comprises calculating the second transmission rate based, at least in part, on an energy-optimized rate for data in the SIMO mode.

6. The method of claim 5, wherein the energy-optimized rate is based, at least in part, on a power consumption associated with circuitry coupled to a single antenna configured to transmit in the SIMO mode.

7. The method of claim 1, wherein the communications system is configured for communication over a communications channel, and wherein selecting the transmission mode is further based, at least in part, on a correlation in the communications channel.

8. The method of claim 1, wherein selecting the transmission mode is further based, at least in part, on a number of receive antennas in the communications system.

9. The method of claim 1, wherein calculating the first and second transmission rates are performed by a base station.

10. A method for selecting a transmission mode for a transceiver in a communications system, the method comprising:
    calculating a first transmission rate for data in a multiple-input multiple-output (MIMO) mode of the communications system based, at least in part, on an energy-optimized rate for data in the MIMO mode, wherein the energy-optimized rate is based, at least in part, on a power consumption of circuitry coupled to a plurality of antennas at the transceiver when the communications system is configured to transmit in the MIMO mode, wherein the energy-optimized rate is further based, at least in part, on a power consumption of the transceiver during an idle time;
    calculating a second transmission rate for the data in a single-input multiple-output (SIMO) mode of the communications system; and
    selecting the transmission mode based, at least in part, on an energy consumption of the transceiver associated with the first and second transmission rates, wherein the selected transmission mode corresponds to either the MIMO mode or the SIMO mode.

11. A method for selecting a transmission mode for a transceiver in a communications system, the method comprising:
    calculating a first transmission rate for data in a multiple-input multiple-output (MIMO) mode of the communications system based, at least in part, on an energy-optimized rate for data in the MIMO mode, wherein the energy-optimized rate is based, at least in part, on a power consumption of circuitry coupled to a plurality of antennas at the transceiver when the communications system is configured to transmit in the MIMO mode, wherein calculating the first transmission rate comprises selecting a maximum rate from the energy-optimized rate and a target rate, wherein the target rate is based, at least in part, on an average throughput for the communications system;
    calculating a second transmission rate for the data in a single-input multiple-output (SIMO) mode of the communications system; and
    selecting the transmission mode based, at least in part, on an energy consumption of the transceiver associated with the first and second transmission rates, wherein the selected transmission mode corresponds to either the MIMO mode or the SIMO mode.

12. The method of claim 11, wherein calculating the first transmission rate comprises selecting a minimum rate from the selected maximum rate and a capacity rate for the communications system, wherein the capacity rate is based, at least in part, on a configuration of the communications system.

13. A method for selecting a transmission mode for a transceiver in a communications system, the method comprising:
    calculating a first transmission rate for data in a multiple-input multiple-output (MIMO) mode of the communications system;
    calculating a second transmission rate for the data in a single-input multiple-output (SIMO) mode of the communications system, wherein calculating the second transmission rate comprises calculating the second transmission rate based, at least in part, on an energy-optimized rate for data in the SIMO mode, wherein calculating the second transmission rate comprises selecting a maximum rate from the energy-optimized rate and a target rate, wherein the target rate is based, at least in part, on an average throughput for the communications systems; and selecting the transmission mode based, at least in part, on an energy consumption of the transceiver associated with the first and second transmission rates, wherein the selected transmission mode corresponds to either the MIMO mode or the SIMO mode.

14. The method of claim 13, wherein calculating the second transmission rate comprises selecting a minimum rate from the selected maximum rate and a capacity rate for the communications system, wherein the capacity rate is based, at least in part, on a configuration of the communications system.

15. A method for selecting a transmission mode for a transceiver in a communications system, the method comprising:
    calculating a first transmission rate for data in a multiple-input multiple-output (MIMO) mode of the communications system;
    calculating a second transmission rate for the data in a single-input multiple-output (SIMO) mode of the communications system;
    selecting the transmission mode based, at least in part, on an energy consumption of the transceiver associated with the first and second transmission rates, wherein the transmission mode corresponds to either the MIMO mode or the SIMO mode; and
    selecting an identity of a single antenna at the transceiver for use in the SIMO mode when the selected transmission mode corresponds to the SIMO mode.

16. A base station for use in communicating over a communications channel, the base station comprising:
    a rate selector configured to generate a first signal corresponding to a first transmission rate for data in a multiple-input multiple-output (MIMO) mode of the communications system, wherein the rate selector is further configured to generate a second signal corresponding to a second transmission rate for data in a single-input multiple-output (SIMO) mode of the communications system;
    a mode selector coupled to the rate selector, wherein the mode selector is configured to receive the first and second signals, and select a transmission mode based, at least in part, on an energy consumption of a transmitter associated with the first and second transmission rates, wherein the transmission mode corresponds to either the MIMO mode or the SIMO mode; and
    the transmitter coupled to the mode selector, wherein the transmitter is configured to transmit a third signal to a transceiver in the communications system, wherein the third signal identifies the selected transmission mode for the transceiver, wherein, when the selected mode is the SIMO mode, the transmitter is further configured to transmit a fourth signal corresponding to an identity of a single antenna for use in the SIMO mode.

17. The base station of claim 16, wherein the rate selector comprises a MIMO rate selector configured to calculate the first transmission rate based, at least in part, on an energy-optimized rate for data in the MIMO mode.

18. The base station of claim 17, wherein the MIMO rate selector is configured to receive a signal indicative of a power consumption of circuitry coupled to a plurality of antennas at the transceiver, and wherein the energy-optimized rate is based, at least in part, on the power consumption of circuitry coupled to the plurality of antennas at the transceiver configured to transmit in the MIMO mode.

19. The base station of claim 16, wherein the rate selector comprises a SIMO rate selector configured to calculate the second transmission rate based, at least in part, on an energy-optimized rate for data in the SIMO mode.

20. The base station of claim 19, wherein the SIMO rate selector is further configured to receive a signal indicative of a power consumption of circuitry coupled to a single antenna at the transceiver, and wherein the energy-optimized rate is based, at least in part, on the power consumption of the circuitry coupled to the single antenna at the transceiver configured to transmit in the SIMO mode.

21. The base station of claim 16, wherein the mode selector is further configured to receive a signal indicative of a number of users of the communications system, and wherein the selected mode is further based, at least in part, on the number of users.

22. The base station of claim 16, wherein the communications system is configured for communication over a communications channel, and wherein the mode selector is further configured to select the mode is based, at least in part, on a correlation in the communications channel.

23. The base station of claim 16, wherein the mode selector is further configured to select the selected transmission mode based, at least in part, on a number of receive antennas at the transceiver.

24. A base station for use in communicating over a communications channel, the base station comprising:
    a rate selector configured to generate a first signal corresponding to a first transmission rate for data in a multiple-input multiple-output (MIMO) mode of the communications system, wherein the rate selector is further configured to generate a second signal corresponding to a second transmission rate for data in a single-input multiple-output (SIMO) mode of the communications system, wherein the rate selector comprises a MIMO rate selector configured to calculate the first transmission rate based, at least in part, on an energy-optimized rate for data in the MIMO mode wherein the MIMO rate selector is configured to receive a signal indicative of a power consumption of circuitry coupled to a plurality of antennas at the transceiver, and wherein the MIMO rate selector is further configured to receive a signal indicative of a power consumption of the transceiver during an idle time;
    a mode selector coupled to the rate selector, wherein the mode selector is configured to receive the first and second signals, and select a transmission mode based, at least in part, on an energy consumption of a transmitter associated with the first and second transmission rates, wherein the transmission mode corresponds to either the MIMO mode or the SIMO mode, wherein the energy-optimized rate is based, at least in part, on the power consumption of circuitry coupled to the plurality of antennas at the transceiver configured to transmit in the MIMO mode, and wherein the energy-optimized rate is further based, at least in part, on the power consumption of the transceiver during the idle time; and
    the transmitter coupled to the mode selector, wherein the transmitter is configured to transmit a third signal to a transceiver in the communications system, wherein the third signal identifies the selected transmission mode for the transceiver.

25. A mobile station for use in a communications system comprising:
- a first antenna and a second antenna;
- first circuitry coupled to the first antenna and configured to process signals for transmission by the first antenna;
- second circuitry coupled to the second antenna and configured to process signals for transmission by the second antenna; and
- a controller coupled to the first and second circuitry, wherein the controller is configured to receive a control signal and, in accordance with the control signal, to select between a multiple-input multiple-output (MIMO) mode wherein both the first and second antennas transmit data over a communications channel and a single-input multiple-output (SIMO) mode wherein only one of the first and second antennas transmit data over a communications channel, wherein the control signal is based, at least in part, on a power consumption of the first and second circuitry, wherein the control signal is based, at least in part, on an idle power consumption of the mobile station.

26. The mobile station of claim 25, wherein the control signal is based, at least in part, on a correlation in the communications channel.

27. The mobile station of claim 25, wherein the control signal is based, at least in part, on energy optimized rates for the MIMO mode and the SIMO mode.

28. The mobile station of claim 25, wherein the control signal is transmitted to the mobile station by a base station.

29. A mobile station for use in a communications system comprising:
- a first antenna and a second antenna;
- first circuitry coupled to the first antenna and configured to process signals for transmission by the first antenna;
- second circuitry coupled to the second antenna and configured to process signals for transmission by the second antenna; and
- a controller coupled to the first and second circuitry, wherein the controller is configured to receive a control signal and, in accordance with the control signal, to select between a multiple-input multiple-output (MIMO) mode wherein both the first and second antennas transmit data over a communications channel and a single-input multiple-output (SIMO) mode wherein only one of the first and second antennas transmit data over a communications channel, wherein the control signal is based, at least in part, on a power consumption of the first and second circuitry, wherein the control signal is based, at least in part, on a number of users of the communications system.

* * * * *